Figure 1:
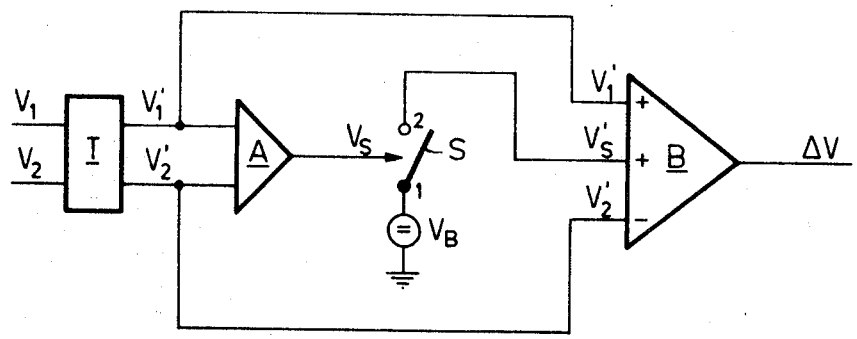

United States Patent [19]
Kuijk et al.

[11] 3,749,939
[45] July 31, 1973

[54] PHASE DIFFERENCE MEASURING DEVICE

[75] Inventors: Karel Elbert Kuijk; Henk Hagenbeuk, both of Emmasingel, Eindhoven, Netherlands

[73] Assignee: U.S. Philips Corporation, New York, N.Y.

[22] Filed: Feb. 17, 1972

[21] Appl. No.: 227,165

[30] Foreign Application Priority Data
Mar. 13, 1972 Netherlands.................. 7103377

[52] U.S. Cl.................. 307/232, 307/228, 328/133
[51] Int. Cl.................. H03d 13/00, H03k 5/20
[58] Field of Search.................. 328/133, 134; 307/228, 232

[56] References Cited
UNITED STATES PATENTS

| | | | |
|---|---|---|---|
| 2,877,416 | 3/1959 | Grisdale | 328/133 X |
| 3,084,859 | 4/1963 | Smith | 328/133 X |
| 3,177,428 | 4/1965 | Klayman | 328/133 X |

*Primary Examiner*—John Zazworsky
*Attorney*—Frank R. Trifari

[57] ABSTRACT

Device for measuring the phase difference between two alternating-voltage signals. These alternating-voltage signals are transformed into sawtooth voltages having equal peak-to-peak values. In an adder there is added to the difference between these sawtooth voltages a voltage which is derived from a direct-voltage supply source via a switching member which is switched at instants which correspond to the steep edges of the two sawtooth voltages, the arrangement being such that the adder delivers a direct voltage proportional to the phase difference between the two sawtooth voltages. The invention is of particular importance for a device for generating two triangular voltages having an adjustable phase difference.

7 Claims, 9 Drawing Figures

PHASE DIFFERENCE MEASURING DEVICE

The invention relates to a device for obtaining a signal proportional to the phase difference between two alternating-voltage signals, for example for synchronizing one signal with the other.

To obtain such a signal may be of great advantage, for example, in measuring and control systems using function generators. Most of the function generators used for this purpose utilize the charge and discharge of a capacitor between two fixed voltage values from a current source. The two fixed voltage values are fixed, for example, by means of a Schmitt trigger. Thus the function generator delivers a triangular voltage and at the same time a square voltage, the former being derived from the capacitor and the latter from the Schmitt trigger. Obviously the triangular voltage may be converted into a sine-wave voltage by means of a diode resistance network.

For several uses it is desirable that two identical voltage wave forms should be available which can have a relative adjustable phase difference. For this purpose two triangular-wave generators may be used which deliver triangular voltages at approximately the same frequency. By measuring the phase difference of the two triangular voltages generated and comparing it with a set value a control voltage is obtainable which enables one of the triangular-wave generators to be controlled in frequency and to be adjusted so that the desired phase difference is produced.

The phase difference measurements may be effected, for example, by means of a synchronous detector. This procedure has the disadvantage that the information about the phase difference will be available only after several cycles of the triangular voltages, because the output signal of the syncrhonous detector must be averaged, for example by means of a low-pass filter. This waiting time adversely affects the control rate of the system.

A second possibility of measuring the phase difference between the two triangular voltages is to measure the relative spacing between, for example, the passages through zero of the two triangular voltages by means of a sample and hold circuit. This method of phase measurement also involves a waiting time, namely at least one cycle of the triangular voltage, before the information is available.

Especially at low frequencies (for example at 0.001 Hz) of the triangular voltages the waiting time which occurs in the abovementioned methods of phase measurement will be considerable and will greatly impair the control rate. It is an object of the present invention to provide a phase difference measuring device which at any desired instant provides information about the phase difference between two signals without the occurrence of waiting periods. The possible uses of the device according to the invention are not restricted to a generator as described hereinbefore, but it may be generally used for phase measurements.

The invention is characterized in that the device comprises a first switching member realizing a connection between a voltage supply source and an adding device and is switched by means of a control signal at instants which correspond to the steep edges of a first and a second sawtooth voltage. These voltages are obtained from the alternating-voltage signals by transformation and have equal peak-to-peak values. In this arrangement the switching member is closed when the steep edge of the first sawtooth voltage appears and is opened when the steep edge of the second sawtooth voltage appears. The voltage supply source delivering a direct voltage which corresponds to the peak-to-peak value of the sawtooth voltages, while the adder forms the sum of the first sawtooth voltage and of the voltage derived via the switching member from the voltage supply source less the second sawtooth voltage.

The conversion of the two alternating-voltage signals into sawtooth voltages may be effected in generally known manners. A triangular voltage may, for example, be transformed into a sawtooth voltage by multiplying the triangular voltage by a square-wave voltage derived from this triangular voltage. A sine-wave voltage may, for example, be first converted by means of a suitable network into a triangular voltage, from which a sawtooth voltage may be derived. The only requirements to be satisfied in the transformation are that any phase shift should be equal for both signals and that sawtooth voltages having equal peak-to-peak values are produced.

Figure 8:
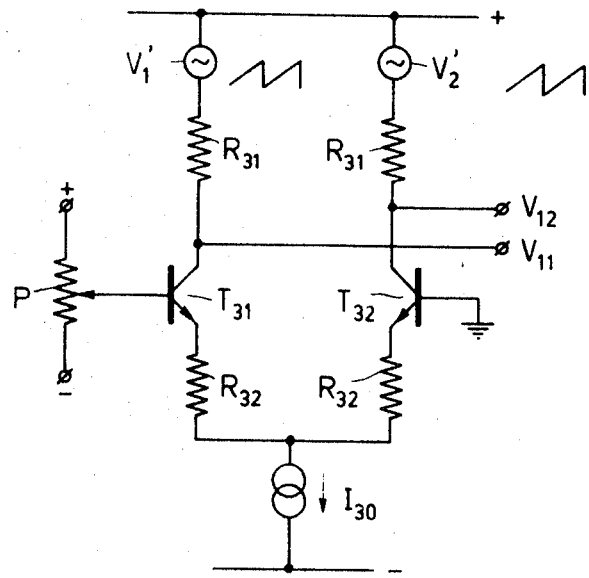
Figure 2:
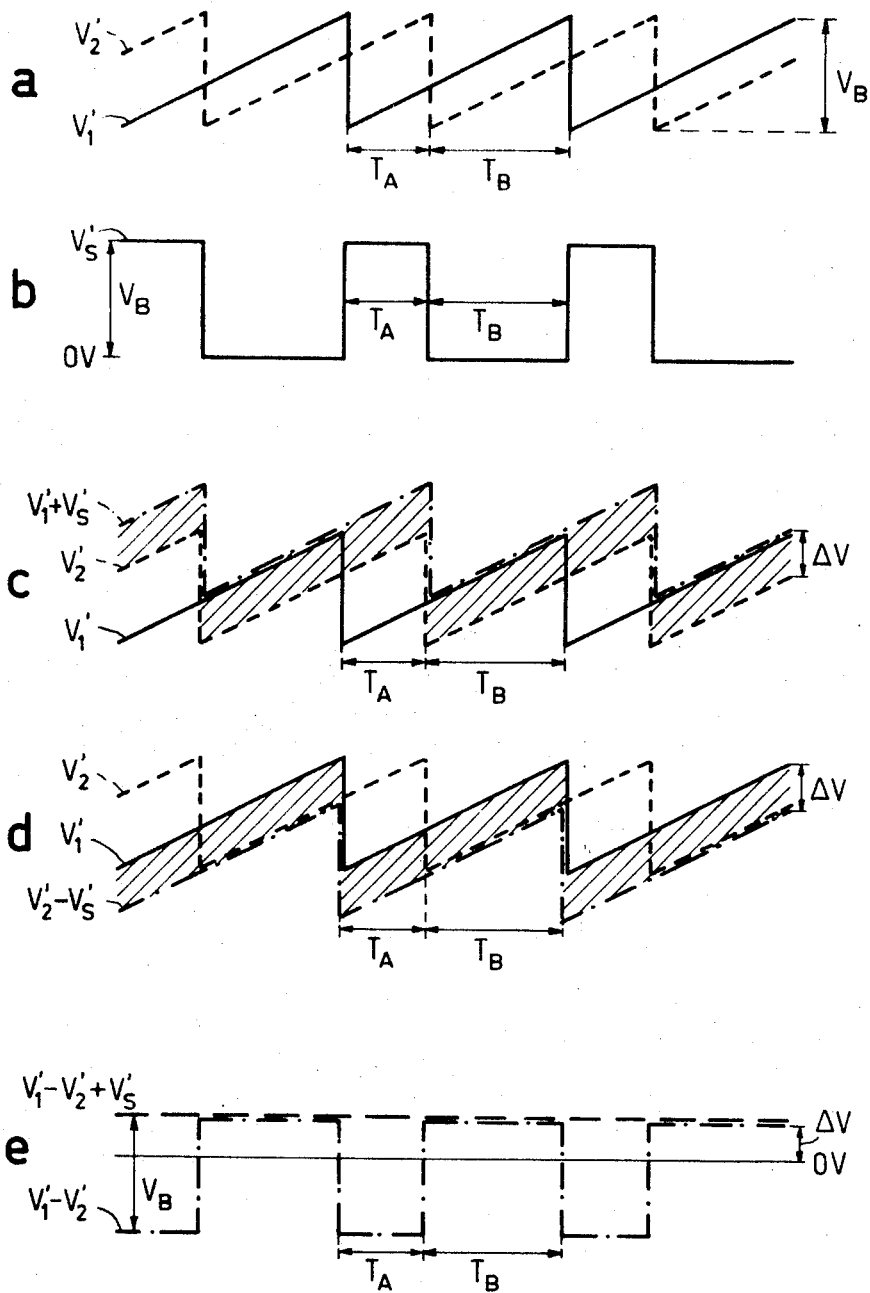
Figure 3:
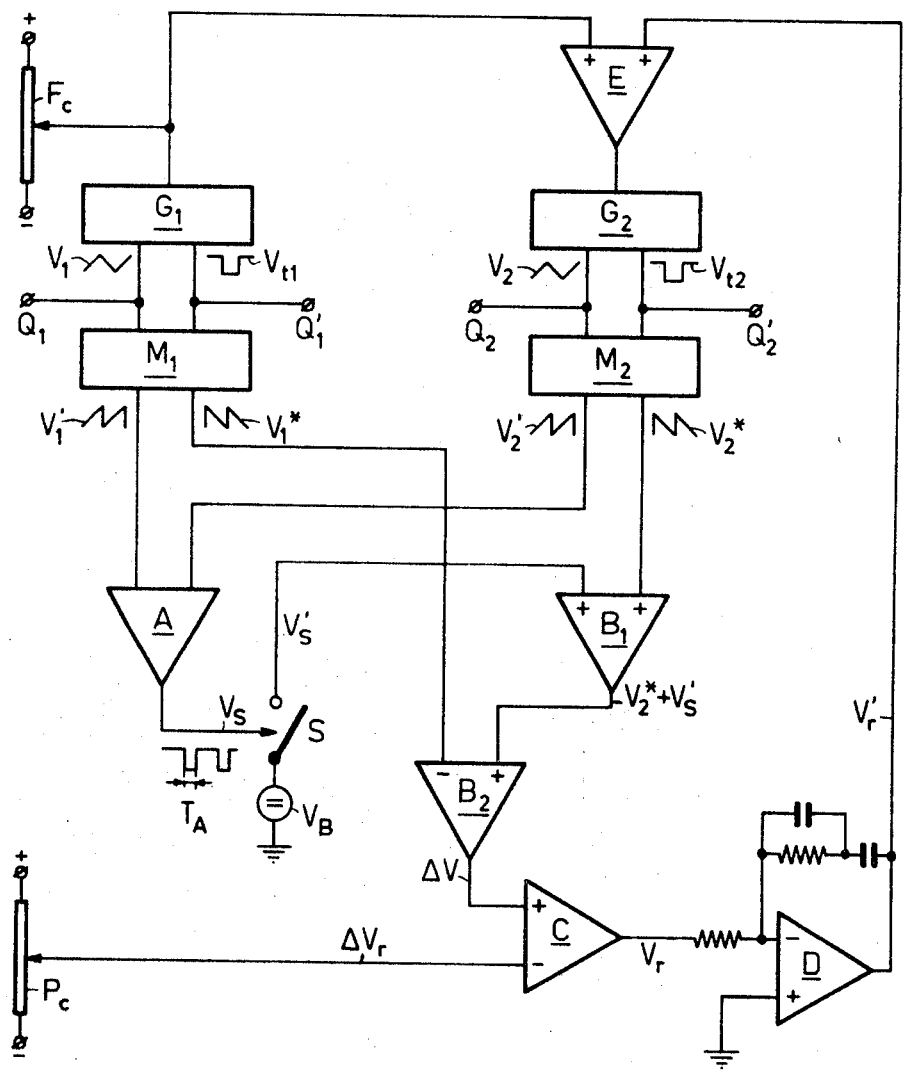
Figure 4:
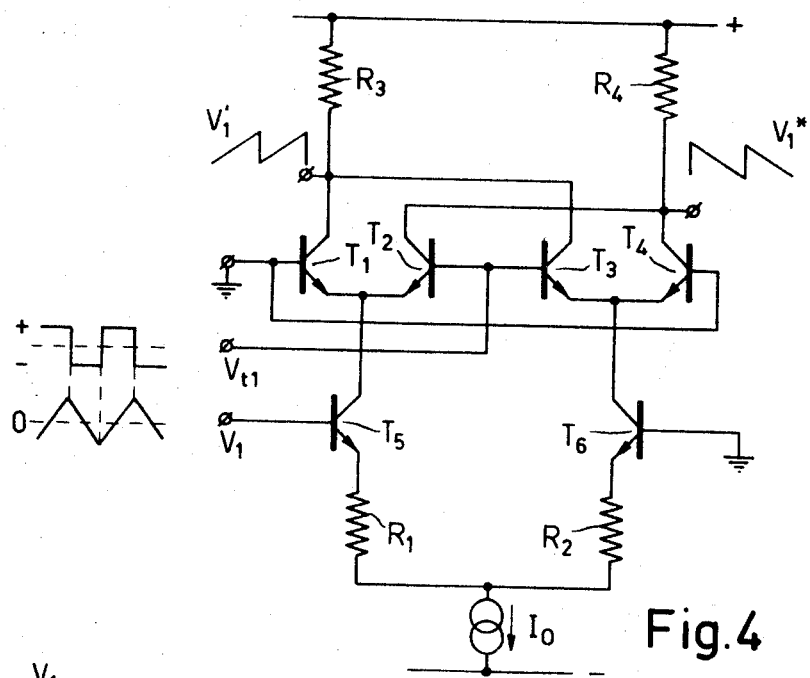
Figure 5:
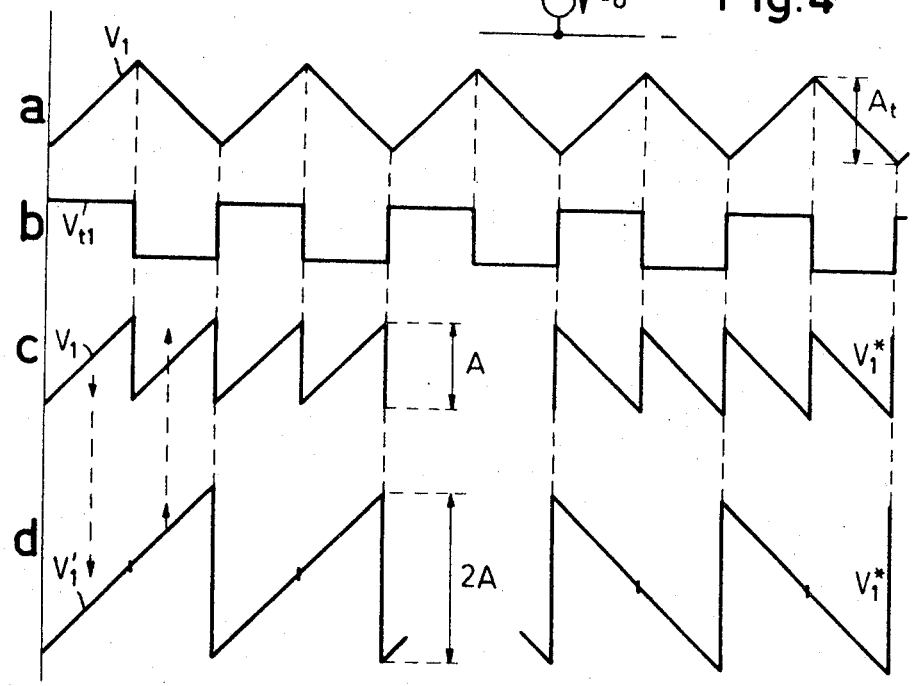
Figure 6:
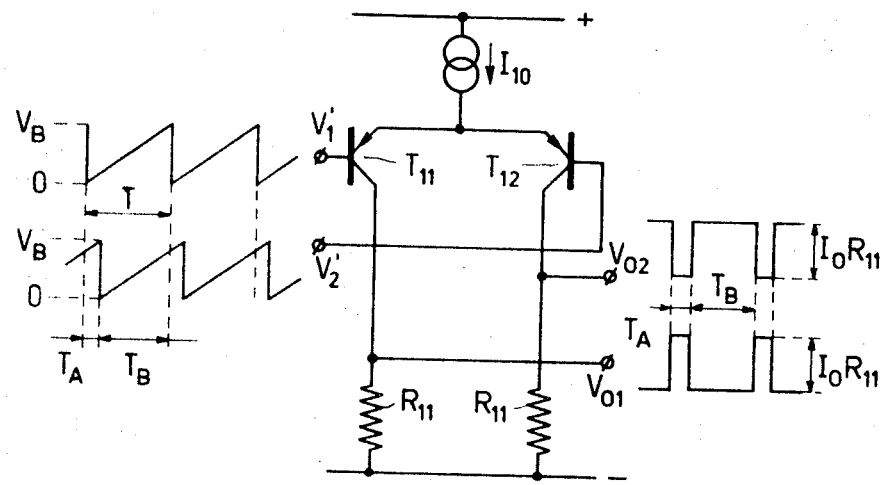
Figure 7:
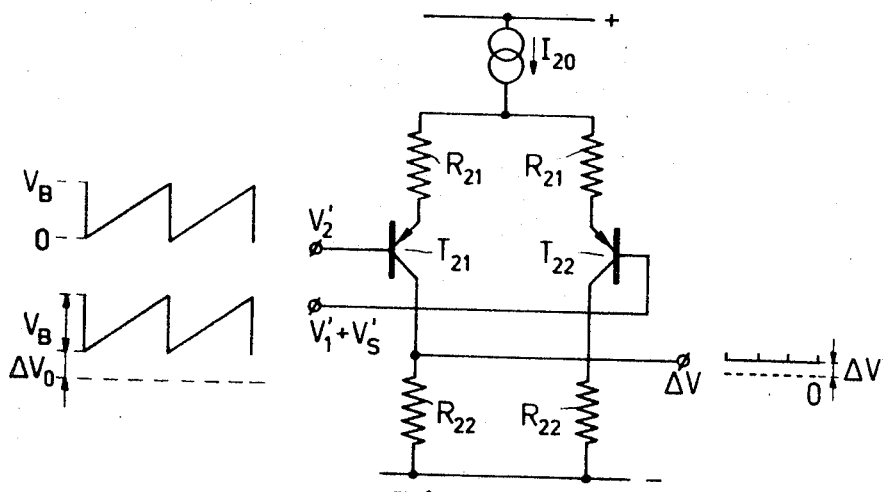
Figure 9:
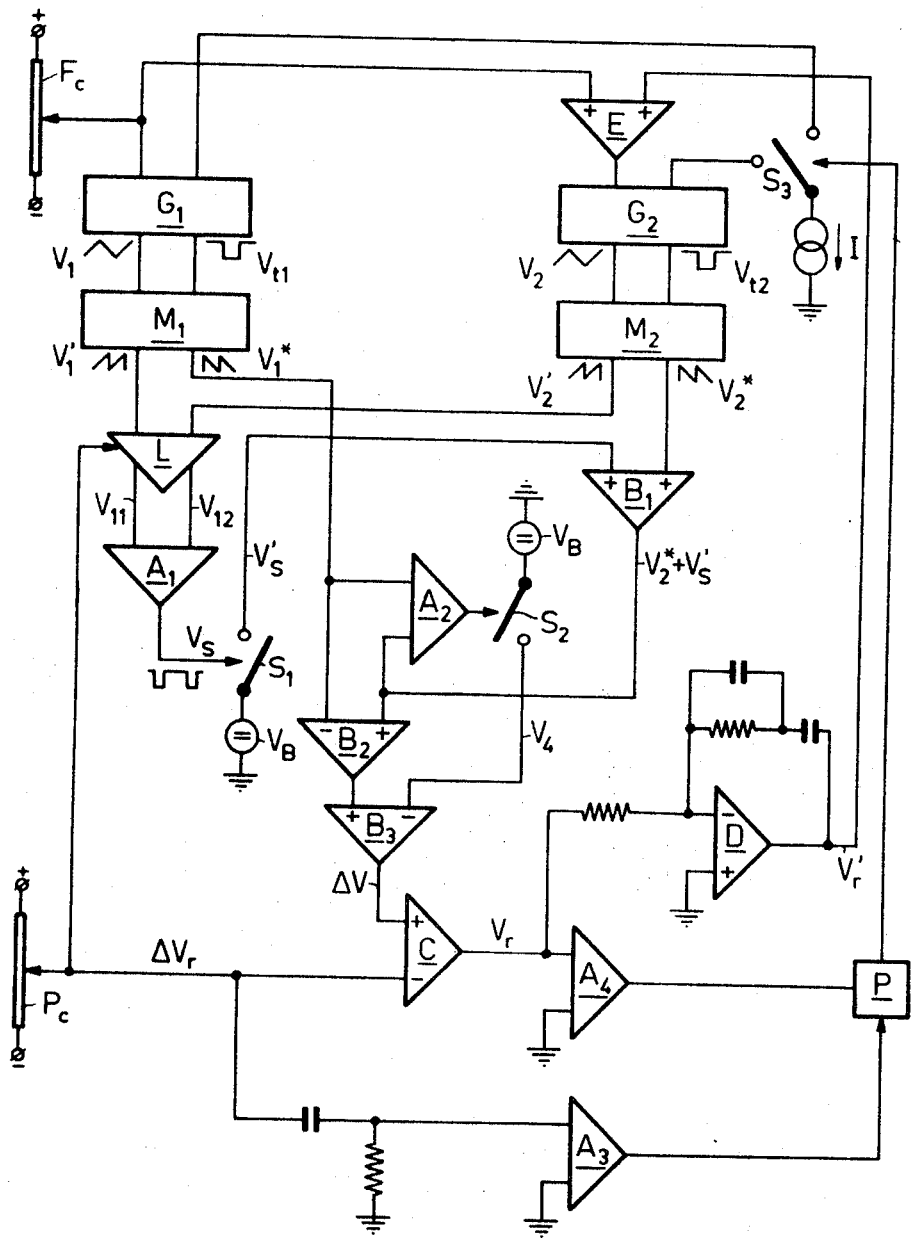

Embodiments of the invention will now be described, by way of example, with reference to the accompanying diagrammatic drawings, in which:

FIG. 1 is a block-schematic diagram of the phase difference measuring device according to the invention, FIG. 2 shows the voltage waveforms produced in this device, FIG. 3 shows a first embodiment of a triangular function generator capable of generating by means of the device according to the invention two triangular voltages having an adjustable phase difference, FIG. 4 shows an embodiment of a multiplier circuit by means of which a triangular voltage may be transformed into a sawtooth voltage, FIG. 5 shows the voltage waveforms which occur in this circuit, FIG. 6 shows an embodiment of a comparison circuit, FIG. 7 shows an embodiment of a subtraction circuit which may be used in the device according to the invention, and FIG. 8 shows a circuit which is capable of shifting the levels of the sawtooth voltages and which may be used in the device according to the invention in a manner as indicated in a second embodiment of a triangular function generator shown in FIG. 9.

The method of obtaining the desired signal which is proportional to the phase difference between two alternating voltages will be described with reference to the block diagram of FIG. 1 and the associated voltage waveforms shown in FIG. 2.

For simplicity it is assumed that the phase difference between two alternating voltages $V_1$ and $V_2$ of equal frequency is to be determined, the voltage $V_2$ lagging the voltage $V_1$. The two voltages are applied to a transformation circuit T which transforms them into two sawtooth voltages $V'_1$ and $V'_2$ having the same peak-to-peak value $V_B$ (see FIG. 2a). This transformation may be effected in known manner, as was stated hereinbefore.

According to the invention the device includes a switching member which for simplicity is shown in FIG. 1 as a switch S but in actual fact will be an electronic switching member. A terminal 1 of this switch S is connected to a direct-voltage source which delivers a direct voltage $V_B$ which corresponds to the peak-to-peak value of the sawtooth voltages $V'_1$ AND $V'_2$.

The switch S is controlled by means of a control voltage $V_S$ which is obtained from the two sawtooth voltages by means of a detection circuit A. A voltage $V'_S$ is desired at a terminal 2 of the switch S this voltage should have a waveform as shown in FIG. 2b, i.e. a square-wave voltage having a value $V_B$ during a time interval $T_A$ and a value 0 during a time interval $T_B$, the time intervals $T_A$ and $T_B$ being determined by the phase difference between the two sawtooth voltages $V'_1$ and $V'_2$.

The time intervals $T_A$ and $T_B$, to effect an appropriate switching behaviour of the switch S, may be obtained in various manners. The detection circuit A may take the form of a comparator. Such a comparator delivers as its output voltage $V_S$ either of two discrete voltages in response to a signal condition wherein the sawtooth voltage $V'_1$ is greater than the sawtooth voltage $V'_2$ or vice versa. The waveforms of the sawtooth voltages clearly show that the sawtooth voltage $V'_1$ is smaller than the sawtooth voltage $V'_2$ during the time interval $T_A$ and is greater than the latter voltage during the time interval $T_B$. Hence the comparator delivers a square-wave voltage $V_S$ having the desired time intervals $T_A$ and $T_B$ for controlling the switch. By so designing the switch S that it is closed at the appearance of the voltage which occurs during the time interval $T_A$ of the square-wave voltage $V_S$ and is opened at the appearance of the other voltage the desired square-wave voltage $V'_S$ is obtained at the terminal 2 of the switch.

Instead of the comparator a switch may be used which determines the difference between the two sawtooth voltages. As will be seen from the waveforms of the sawtooth voltages, this difference voltage also will be a square-wave voltage having periods $T_A$ and $T_B$. In this case, however, the levels of the two voltage values of the square-wave voltage depends upon the phase difference between the two sawtooth voltages, so that steps must be taken to ensure that satisfactory switching is maintained at any phase difference.

A third possibility of obtaining a suitable control voltage $V_S$ consists in differentiating the sawtooth voltages. During the steep edge of a sawtooth voltage differentiation will produce a peak pulse. By so designing the switching device that it is closed at the appearance of a peak pulse due to the sawtooth voltage $V'_1$ and is opened at the appearance of a peak pulse due to the sawtooth voltage $V'_2$ the desired switching behaviour and hence the desired voltage $V'_S$ are again obtained.

From the above it will be clear that there are several possibilities of producing the desired square-wave voltage $V'_S$ having the appropriate periods $T_A$ and $T_B$. According to the invention this square-wave voltage $V'_S$ is applied to an adder B to which are also applied the two sawtooth voltages $V'_1$ and $V'_2$, the arrangement being such that at the output of the adder a signal is produced which represents the arithmetic sum $V'_1 + V'_S - V'_2$. Owing to this circuit configuration, at any instant the output signal of the adder B is a measure of the phase difference between the two sawtooth voltages $V'_1$ and $V'_2$. In one case under consideration — with a constant phase difference between the two sawtooth voltages — the output signal of the adder B will be a constant voltage. This will be explained with reference to the voltage waveforms shown in FIGS. 2c, 2d and 2e.

FIG. 2c shows the two sawtooth voltages $V'_1$ and $V'_2$. It is further assumed that the adder B includes an adder which forms the sum of the voltages $V'_1$ and $V'_S$. This means that this sum voltage is equal to the initial sawtooth voltage $V'_1$ during the time interval $T_B$, and equal to $V'_1$ plus a constant voltage $V_B$ equal to the peak-to-peak value of the sawtooth voltages during the time interval $T_A$. This summation of the voltages $V'_1$ and $V'_S$ thus produces a sawtooth voltage having a waveform as shown in FIG. 2c. As FIG. 2c clearly shows, this sawtooth voltage $V'_1 + V'_S$ is in phase with the sawtooth voltage $V'_2$. The difference between the voltage $V'_1 + V'_S$ and the voltage $V'_2$, which difference may be produced by means of a second adder having an inverting input, consequently is a constant voltage $\Delta V$, which is shown by shading in FIG. 2c, and this difference voltage $\Delta V$ is a measure of the phase difference between the two sawtooth voltages $V'_1$ and $V'_2$. As may readily be seen from FIG. 2c, this difference voltage $\Delta V$, for which the condition holds that $0 < \Delta V < V_B$, corresponds to a phase difference $\phi$ between the two sawtooth voltage $V'_1$ and $V'_2$ having a value $0° < \phi < 360°$.

The arithmetical sum $V'_1 + V'_S - V'_2$ may also be formed by first subtracting the square-wave voltage $V'_S$ from the sawtooth voltage $V'_2$ and then determining the difference between the sawtooth voltage $V'_1$ and the resulting sawtooth voltage $V'_2 - V'_S$, as is shown in FIG. 2d. Thus the constant voltage $\Delta V$ is again obtained.

Finally, the difference between the sawtooth voltages $V'_1$ and $V'_2$ may first be determined, as is shown in FIG. 2e. This difference also is a square-wave voltage having a voltage value $\Delta V$ during the time interval $T_B$ and a voltage value $\Delta V - V_B$ during the time interval $T_A$. Adding this square-wave voltage to the square-wave voltage $V'_S$ again gives a constant voltage $\Delta V$ which is equal to $V'_1 + V'_S - V'_2$.

The latter possibility of forming the arithmetical sum $V'_1 + V'_S - V'_2$ is of particular importance when the detection device A determines the difference between the two sawtooth voltages in any case. Then it is necessary only to add $V'_S$ to this difference to obtain the desired voltage $\Delta V$.

Hereinbefore it has been assumed that the two sawtooth voltages $V'_1$ and $V'_2$ have the same frequency so that their phase difference is constant. However, from the above it will be clear that when the two sawtooth voltages have different frequencies and hence their phase difference varies, the arrangement according to the invention still provides a direct voltage $\Delta V$ which, however, now is no longer constant but at any instant is a measure of the phase difference between the sawtooth voltages. With a linear phase difference between the two sawtooth voltages, $\Delta V$ will be a sawtooth voltage which varies from 0 volts to $V_B$ and has a frequency equal to the difference in frequency between the two sawtooth voltages.

As has been stated hereinbefore, the invention may in particular be used in triangular function generators by means of which two triangular voltages having an adjustable phase difference are to be produced, as will be described with reference to the block diagram shown in FIG. 3.

The generator shown in this block diagram first comprises two identical triangular function generators $G_1$ and $G_2$, for example of the type described in Electronic Engineering, June 1967, page 388 sqq. The frequency of the triangular voltages delivered by these triangular function generators is adjustable by means of an adjusting potentiometer $F_c$.

According to the invention each of the triangular voltages $V_1$ and $V_2$ delivered by the generators is transformed into a sawtooth voltage. For this purpose square-wave voltages $V_{t1}$ and $V_{t2}$ produced by Schmitt triggers included in the triangular function generators may be used. Forming the product of the voltages $V_1$ and $V_{t1}$ and that of the voltages $V_2$ and $V_{t2}$ by means of multiplier circuits $M_1$ and $M_2$ respectively gives rise to sawtooth voltages, as will be shown with reference to FIG. 4. Each of the two multiplier circuits $M_1$ and $M_2$ delivers two sawtooth voltages $V'_1$ and $V_1$, and $V'_2$ and $V_2$ respectively which are inverse with respect to one another. When the triangular voltages are suitably transformed into the sawtooth voltages the phase difference between the sawtooth voltages $V'_1$ and $V'_2$ will be equal to the phase difference between the triangular voltages $V_1$ and $V_2$. Obviously the same applies to the inverse sawtooth voltages $V_1$ and $V_2$.

According to the invention the phase difference between the sawtooth voltage is determined in a manner corresponding to that described with reference to the block diagram of FIG. 1. The control signal $V_S$ is obtained from the sawtooth voltages $V'_1$ and $V'_2$, while the desired voltage $\Delta V$ is derived from the sawtooth voltages $V_1$ and $V_2$ and the square-wave voltage $V_S$ by means of adders $B_1$ and $B_2$. Because the inverse sawtooth voltages $V_1$ and $V_2$ are used to obtain the desired voltage $\Delta V$, the arithmetic sum $V_2 + V'_S - V_1$ is to be formed. Naturally, the voltage V may also be realized by forming the arithmetic sum $V'_1 + V'_S - V'_2$ again.

The resulting voltage $\Delta V$ is applied to one input of a difference amplifier C to the second input of which a voltage $\Delta V_r$ is applied. The voltage $\Delta V_r$ is taken from an adjusting potentiometer $P_c$ by means of which the desired phase difference between the triangular voltages is adjustable. The output of this difference amplifier C thus delivers a control signal $V_r$ which is a measure of the deviation of the instantaneous phase difference between the triangular voltages from the desired phase difference. This control signal $V_r$ is applied to a control device which comprises an amplifier D provided with feedback. This control device must not be entirely integrating, because the system of the triangular function generators and the phase detector acts as an integrator in any case, so that if the control member is entirely integrating there would be a likelihood of instability. In general, the control device will be proportionally integrating. The output voltage $V_r'$ of this control device is applied to an adder E to which is also applied the voltage derived from a frequency adjusting potentiometer $F_c$.

This ensures that the frequency of the generator $G_2$ is adjusted in accordance with the control signal $V_r'$ until the desired phase difference between the triangular voltages $V_1$ and $V_2$ has been reached. When, for example, the phase difference is too great, $V_r'$ will be positive and the frequency of the generator $G_2$ will increase. The use of the device according to the invention provides the advantage that at any instant information about the phase difference between the triangular voltages is available and no waiting periods occur, permitting control to be fast.

Obviously the control behaviour of the entire system may be varied by varying the control device, i.e. the amplifier D provided with feedback.

The possible structure of a few of the blocks shown in FIG. 3 will now be described, by way of example, with reference to the three following Figures.

The triangular voltages may be converted into sawtooth voltages, for example, by means of a multiplier circuit as shown in FIG. 4. This multiplier circuit in known manner comprises six transistors $T_1 \ldots T_6$, four resistors $R_1 \ldots R_4$ and a current supply source $I_o$. The bases of the transistors $T_1$, $T_4$ and $T_6$ are connected to ground, and it is assumed that a triangular voltage $V_1$ (see FIG. 5a) is applied to the base of the transistor $T_5$. It is further assumed that the square-wave voltage $V_{t1}$ (see FIG. 5b) produced by the Schmitt trigger of the relevant triangular function generator is applied to the bases of the transistors $T_2$ and $T_3$. Thus, across the resistors $R_3$ and $R_4$ the sawtooth voltages $V_1'$ and $V_1$ are produced which are inverse if $R_3 = R_4$.

The frequency and the peak-to-peak value of these sawtooth voltages $V_1'$ and $V_1$ are determined by the choice of the resistors $R_1$, $R_2$, $R_3$ and $R_4$, the current supply source $I_o$ and the peak-to-peak value $A_t$ of the triangular voltage $V_1$. If $R_1 = R_2$ and $R_3 = R_4 = R$, sawtooth voltages $V_1'$ and $V_1$ will be produced of the forms shown in FIG. 5c. These sawtooth voltages have a frequency which is twice that of the triangular voltage and a peak-to-peak value of $$A = R/(R_1 + R_2) A_t.$$

By making $R_1$ different from $R_2$ it can be ensured that the edges of the sawtooth voltages corresponding to an ascending edge and a descending edge respectively of the triangular voltage suffer opposite level shifts. Thus a suitable choice of $R_1$ and $R_2$ such that $$R_1 - R_2 = A_t/I_o,$$

enables the sawtooth voltages shown in FIG. 5d to be produced. These sawtooth voltages have the same frequency as has the triangular voltage and a peak-to-peak value of 2A. Consequently, the phase difference between two sawtooth voltages thus obtained from two triangular voltages entirely corresponds to the phase difference between the triangular voltages.

FIG. 6 shows a comparator by means of which the time intervals $T_A$ and $T_B$ of two sawtooth voltages, which may for example have been obtained in the aforedescribed manner, can be determined so that an appropriate control signal for the switching member S of the device according to the invention is obtained. This comparator comprises two transistor $T_{11}$ and $T_{12}$ connected as a differential amplifier and each having a resistor $R_{11}$ in its collector circuit. When the sawtooth voltages $V'_1$ and $V'_2$ are applied to the bases of $T_{11}$ and $T_{12}$ respectively, at the output terminals $V_{o1}$ and $V_{o2}$ square-wave voltages are produced which each have an amplitude $I_oR_{11}$ and periods $T_A$ and $T_B$. These periods are determined by the phase difference between the two sawtooth voltages, so that an appropriate control signal for the switching member of FIG. 3 is obtained.

FIG. 7 shows a circuit by means of which, for example, the difference between the two sawtooth voltages $V'_1 + V'_s$ and $V'_2$ (see FIG. 2c) may be determined. The circuit comprises two transistors $T_{21}$ and $T_{22}$ the emitters of which are each connected through a resistor $R_{21}$ to a current source $I_{20}$ and the collector circuits of which each include a resistor $R_{22}$. The voltage across one of these resistors $R_{22}$ then is proportional to $\Delta V = V'_1 + V'_s - V'_2$ and hence the desired voltage is proportional to the phase difference of the sawtooth voltages $V'_1$ and $V'_2$.

FIG. 8 shows a circuit capable of providing a phase shift of the two sawtooth voltages $V'_1$ and $V'_2$ which depends upon the setting of the potentiometer P. If this potentiometer is set to the center position, the levels of the two sawtooth voltages will be shifted in equal degrees, while in the extreme settings of the potentiometer the level shifts of the two sawtooth voltages will show a maximum difference. This is of importance for determining the time interval $T_A$, for example by means of a comparator. When the phase difference between the sawtooth voltages is very small or very close to 360°, THE SAwtooth voltages are close to one another, so that it is difficult to determine the time interval $T_A$ by means of the comparator. Coupling the potentiometer P to the phase adjusting potentiometer $P_c$ ensures that at the said phase differences the two sawtooth voltages suffer different level shifts and hence become more widely spaced apart. Obviously, the adjusting potentiometer $P_c$ may directly be used for adjusting the level shifting circuit.

In conjunction with this level shift the device according to the invention may be extended so as to enable it to set and measure phase differences beyond the interval from 0° to 360° also. For this purpose the measuring characteristic is obviously required to be continuous, i.e. that $\Delta V$ becomes negative for phase differences of less than 0° and is $2A + \Delta V'$ for phase differences exceeding 360°, where $\Delta V'$ is a voltage corresponding to the phase difference exceeding 360°.

In such an arrangement the phase difference may be measured in the manner illustrated in FIG. 9. Assuming a phase difference of less than 0° to be set by the adjusting potentiometer $P_c$, the two sawtooth voltages $V'_1$ and $V'_2$ suffer level shifts which differ to an extent such that the two sawtooth voltages $V_{11}$ and $V_{12}$ no longer have points of intersection. This means that the comparator $A_1$ to which these voltages are applied will no longer deliver a square-wave voltage about zero, but will deliver a fluctuating voltage which always has the same sign. Assuming the sign of this voltage to be such that the switch $S_1$ is always open, then nothing will be added to $V_2$ in the adding circuit $B_1$ ($V_3 = 0$).

The output voltage $V_2$ of the adding circuit $B_1$ now is reduced by the voltage $V_1$ by means of the adding circuit $B_2$. At the same time, however, these voltages are applied to a second comparator $A_2$. Since $V_1$ and $V_2$ now are at the same level and out of phase, the output voltage $A_2$ is a square-wave voltage about zero. By means of this square-wave voltage a second switch $S_2$ is controlled which again is connected to a supply source $V_B$. Finally, by means of an adding circuit $B_3$ the output voltage of the adding circuit $B_2$ is reduced by the square-wave voltage from this switch $S_2$, with the result that again a direct voltage $\Delta V$ proportional to the phase difference is produced.

It will be clear that in the case of phase differences between 0° and 360° the switch $S_2$ is inoperative, because in this case the output voltage $V_2 + V'_s$ from the adding circuit $B_1$ is in phase with the voltage $V_1$ and the comparator is designed so that in this case the switch $S_2$ is continuously open.

Naturally the phase margin may be increased by dividing the frequencies of the sawtooth voltages by means of an additional divider circuit without the need for any further modifications of the circuit shown in FIG. 3. If, for example, the frequencies are divided by two, a phase margin of 360° of the sawtooth voltages corresponds to a phase margin of 720° of the triangular voltages.

In order to obtain fast control especially at low frequencies the circuit may be extended in the manner shown in FIG. 9. This extension first comprises a comparator $A_3$ the output voltage of which operates a gate P. A signal derived via an RC network from the phase reference voltage $\Delta V_r$ is applied to one of the inputs of this comparator $A_3$. This arrangement ensures that in the case of variations in the setting of the phase adjusting potentiometer $P_c$ the gate P is open for a certain time. During this time a signal from the comparator $A_4$ is transmitted to a switch $S_3$. This signal from the comparator $A_4$ will be positive or negative according to the sign of the control voltage $V_r$. Consequently during the said time the switch $S_3$ is connected either to a generator $G_1$ or to a generator $G_2$, so that the relevant generator is rapidly adjusted in frequency by the current supply source I. Thus the phase difference is rapidly adjusted to a value close to the desired value and then will be further adjusted by the proportionally integrating control arrangement. Obviously it is possible to provide fast adjustment of one only of the generators by using two current supply sources supplying opposed currents which are switched by the switch $S_3$.

What is claimed is:

1. A device for measuring the phase difference between two alternating-voltage signals, comprising an alternating-voltage to sawtooth-voltage converting means for providing a first sawtooth voltage having a frequency and phase corresponding to the first alternating voltage and for providing a second sawtooth voltage having an amplitude equal to that of the first sawtooth voltage and having a frequency and phase corresponding to the frequency and phase of the second alternating voltage, each cycle of the first and second sawtooth voltages comprising a linear portion wherein the voltage gradually changes in one direction during a time interval substantially equal to the entire sawtooth period and a steep edge wherein the voltage abruptly changes in the opposite direction, detector means connected to the alternating-voltage to sawtooth-voltage converting means for providing a control signal in response to the first and second sawtooth voltages and having a duration equal to the time interval between a steep edge of the first sawtooth voltage and the next succeeding steep edge of the second sawtooth voltage, a voltage supply having a DC output voltage corresponding to the peak-to-peak value of the first and second sawtooth voltages, switching means connected to the voltage supply and to the detector means for connecting the voltage supply to an output of the switching means in response to the control signal from the detector means, and arithmetic means connected to the output of the switching means and to the alternating-voltage to the sawtooth-voltage converter means for forming the sum of the first sawtooth voltage and the output of the first switching means and for providing an output signal equal to the difference between this sum and the second sawtooth voltage.

2. A device as claimed in claim 1, wherein the detector means comprises a comparator connected to the first and second sawtooth voltages and providing a first output signal in response to a condition wherein the instantaneous value of the first sawtooth voltage is larger than the instantaneous value of the second sawtooth voltage and providing a second output signal in response to a condition wherein the second sawtooth voltage is larger than the first sawtooth voltage.

3. A device as claimed in claim 1, further comprising a first triangular wave generating means for providing the first alternating voltage, a second triangular wave generating means for providing the second alternating voltage, means for transforming the first triangular wave signal into a first square wave signal having a frequency and phase corresponding to the first triangular wave signal, means for transforming the second triangular wave signal into a second square wave signal having a frequency and phase corresponding to the second triangular wave signal, wherein the alternating-voltage to sawtooth-voltage converter means comprises means for multiplying the first square wave voltage signal with the first triangular wave voltage signal, and means for multiplying the second square wave voltage signal with the second triangular wave voltage signal, the device further comprising means for connecting the output of the arithmetic means to the first triangular wave generating means as a frequency control signal.

4. A device as claimed in claim 3, wherein the means connecting the arithmetic means to the first triangular wave generating means comprises a proportionally integrating control member.

5. A device as claimed in claim 3, wherein the switching means comprises a comparator providing a first control signal in response to a condition wherein the instantaneous value of the first sawtooth voltage is larger than the instantaneous value of the second sawtooth voltage and providing a second control signal in response to a condition wherein the instantaneous value of the second sawtooth voltage is larger than the instantaneous value of the first sawtooth voltage, a level shifting circuit connected in series between the detector means and the alternating-voltage to sawtooth-voltage converter means for providing a substantially equal level shift between the two sawtooth voltages in response to a condition wherein the phases of the sawtooth voltages are displaced by 180° and for shifting the levels of the sawtooth voltages in opposite senses in response to conditions wherein the phases of the sawtooth voltages differ from 180°.

6. A device as claimed in claim 5, wherein the level shifting circuit comprises a first transistor, a second transistor, a first resistor, a second resistor, a current supply source, means connecting the emitter of the first transistor to the current supply source through the first resistor, means connecting the emitter of the second transistor to the current source through the second resistor, a third resistor, a fourth resistor, means connecting the collector of the first transistor to the first sawtooth voltage through the third resistors, means connecting the collector of the fourth transistor to the second sawtooth voltage through the fourth resistor, the ends of the third and fourth resistors proximate the collectors of the first and second transistors being connected to the comparator.

7. A device as claimed in claim 5, further comprising a second voltage supply providing a DC voltage corresponding to the peak-to-peak voltage of the sawtooth voltage signals, a second switching means having a control input connected to the output of the detector means and operating in phase opposition to the first switching means, the second switching means providing the DC voltage of the second voltage supply to the arithmetic means in a negative sense, and wherein the level shifting circuit further comprises means for shifting the levels of the sawtooth voltages to levels wherein the level-shifted sawtooth voltages no longer have points of intersection in response to a phase difference in the sawtooth voltages outside the interval from 0° to 360°.

* * * * *

UNITED STATES PATENT OFFICE
CERTIFICATE OF CORRECTION

Patent No. 3,749,939   Dated July 31, 1973

Inventor(s) KAREL ELBERT KUIJK ET AL

It is certified that error appears in the above-identified patent and that said Letters Patent are hereby corrected as shown below:

ON THE TITLE PAGE

"[30]   Foreign Application Priority Data

Mar. 13, 1972   Netherlands................7103377"

should read

--[30] Foreign Application Priority Data

Mar. 13, 1971 Netherlands................7103377--;

IN THE SPECIFICATION

Col. 5, line 14, "$V'_1$" second occurence should be --$V'_1*$--;

line 15, "$V_2$" should be --$V_2*$--;

line 21, "$V_1$ and $V_2$" should be --$V_1*$ and $V_2*$--;

line 28, "$V_1$ and $V_2$" should be --$V_1*$ and $V_2*$--;

line 31, "$V_1$ and $V_2$" should be --$V_1*$ and $V_2*$-- line 32, "$V_2+V'_s-V_1$" should be --$V_2*+V'_s-V_1*$--;

Col. 6, line 19, "$V_1$" should be --$V_1*$--;

line 22, "$V_1$" should be --$V_1*$--;

line 26, "$V_1$" should be --$V_1*$--;

PAGE 2

UNITED STATES PATENT OFFICE
CERTIFICATE OF CORRECTION

Patent No. 3,749,939  Dated July 31, 1973

Inventor(s) KAREL ELBERT KUIJK ET AL

It is certified that error appears in the above-identified patent and that said Letters Patent are hereby corrected as shown below:

Col. 7, line 3, "$V'_s$" should be --$V'_3$--;

line 17, "THE SAwtooth" should be --the sawtooth--;

line 48, "$V_2$" should be --$V_2^*$--;

line 49, "$V_2$" should be --$V_2^*$--;

line 50, "$V_1$" should be --$V_1^*$--;

line 52, "$V_1$ and $V_2$" should be --$V_1^*$ and $V_2^*$--;

line 64, "$V_2 + V'_s$" should be --$V_2^* + V'_s$--;

line 65, "$V_1$" should be --$V_1^*$--;

IN THE CLAIMS

Claim 1, line 30, cancel "the";

Claim 6, line 10, "resistors" should be --resistor--;

Signed and sealed this 25 day of December 1973.

(SEAL)
Attest:

EDWARD M. FLETCHER, JR.  RENE D. TEGTMEYER
Attesting Officer  Acting Commissioner of Patents